United States Patent [19]

Stocker et al.

[11] 3,965,268

[45] June 22, 1976

[54] EXPANDED PROTEIN PRODUCT COMPRISING SULFUR-CONTAINING ORGANIC COMPOUND

[75] Inventors: Charles T. Stocker, Augusta; Robert E. Schara, Battle Creek, both of Mich.; William E. Marshall, Mount Kisco, N.Y.; John T. Hayes, Jr., North Tarrytown, N.Y.; Martin Glicksman, Valley Cottage, N.Y.

[73] Assignee: General Foods Corporation, White Plains, N.Y.

[22] Filed: Mar. 1, 1974

[21] Appl. No.: 447,172

Related U.S. Application Data

[63] Continuation of Ser. No. 244,996, April 17, 1972, abandoned, which is a continuation of Ser. No. 876,081, Nov. 12, 1969, abandoned.

[52] U.S. Cl. .............................. 426/331; 426/625; 426/634; 426/656; 426/657; 426/448
[51] Int. Cl.² ........................ A23J 1/02; A23J 1/12; A23J 1/14
[58] Field of Search ........... 426/212, 364, 346, 448, 426/516, 517, 802, 104, 657, 447, 559, 656, 625, 634, 532, 335, 331; 260/112 R

[56] References Cited
UNITED STATES PATENTS

| | | | |
|---|---|---|---|
| 3,390,999 | 7/1968 | Jantzen | 426/364 |
| 3,484,251 | 12/1969 | Lawrence | 426/158 |
| 3,498,794 | 3/1970 | Calvert et al. | 99/17 |
| 3,759,715 | 9/1973 | Loepiktie et al. | 426/802 |
| 3,812,267 | 5/1974 | Atkinson | 426/802 |

FOREIGN PATENTS OR APPLICATIONS

| | | | |
|---|---|---|---|
| 1,049,848 | 11/1966 | United Kingdom | 99/17 |

*Primary Examiner*—Norman Yudkoff
*Assistant Examiner*—Curtis P. Ribando
*Attorney, Agent, or Firm*—Thaddius J. Carvis; Bruno P. Struzzi

[57] ABSTRACT

An expanded edible protein product is made by extruding, preferably following heating and working of, a mix containing a proteinaceous material, a sulfur-containing organic compound, and water from a high pressure zone to a low pressure zone. The resultant product has an open, cellular structure and is an excellent meat-like substitute, convenience food and pet food ingredient, and snack item.

10 Claims, No Drawings

EXPANDED PROTEIN PRODUCT COMPRISING SULFUR-CONTAINING ORGANIC COMPOUND

This is a continuation of application Ser. No. 244,996 filed Apr. 17, 1972, which in turn is a continuation of Ser. No. 876,081, filed Nov. 12, 1969, both of which are now abandoned.

BACKGROUND OF THE INVENTION

This invention relates to the preparation of an expanded edible protein product which can be utilized in a variety of food products for human and animal consumption. More particularly, the invention relates to heat-processing and working a mix containing a proteinaceous material and a sulfur-containing organic compound and subsequently extruding the mix to produce an expanded protein product having unique physical properties and adaptable for utilization in a wide variety of edible products.

There is a major effort in the world today to produce nutritious, low cost, high protein content meat substitute products. The need for such products which are sought for animal as well as human consumption is wide-spread. A significant effort has been directed toward the utilization of protein flours and meals derived from fish and vegetable seeds, particularly oil seeds such as soy bean, peanut, cottonseed, and the like, to obtain products having desired meat-like texture, consistency, appearance and taste and optimum nutritional values.

British Patent Specification No. 1,049,848, complete specification published Nov. 30, 1966, describes a meat-like product obtained by extrusion-expansion of a protein material derived from vegetable, fish and similar sources via extrusion. The meat-like product is defined as having a plexilamellar structure and as being characterized by an open cell structure in which a majority of the cells have a length to diameter ratio of greater than one, the length being measured in the direction of extrusion and the diameter being measured in the transverse direction. The product, while described as being an expanded product, is found, however, to be very limited in its degree of expansion. Indeed, it is observed that the process there described tends to result in a rather dense product.

More recently, in Australian Patent Specification 15,030/66, laid open to public inspection on June 13, 1968, the preparation of a fibrous porous food product from a protein-containing vegetable material employing an extruder to process a heated, pressurized, mechanically worked mixture of the material is described. The specification further mentions that the addition of a minute amount of elemental sulfur, potassium sulfide or sodium sulfide to the mixture prior to extrusion results in advantageous physical characteristics in the fibrous product.

As indicated above, the expanded protein-containing product described in the British specification tends to be rather dense. On the other hand, the fibrous food product described in the Australian specification, while of a lower density generally, may have residual amounts of sulfur or sulfides present which can produce sometimes detectable off-tastes in the resultant product.

The present invention is directed toward overcoming the disadvantages apparent in the products disclosed in the above-referred-to British and Australian specifications. Other advantages of this invention may be seen from the description which follows.

SUMMARY OF THE INVENTION

It has now been discovered that an expanded edible protein product having a meat-like texture and appearance can be prepared at low cost and with ease in processing. The expanded protein product is capable of absorbing many times its weight in water and can be infused with other ingredients such as liquid extracts, flavors, and the like. The product is thus adaptable to a variety of uses such as simulated meat pieces in main course dishes, in numerous convenience foods, and in pet foods. The expanded product has a crisp, crunchy texture which lends itself to use in a large number of foodstuffs such as snack items. Moreover, the expanded protein product may have incorporated in it foodstuff pieces as, for example, meats, cheeses, and the like, and it may also be impregnated or coated with numerous foodstuff ingredients.

The expanded product is obtained by processing a mixture of a high proteinaceous material, a sulfur-containing organic compound and water through an extruder. The mix is heated and worked so as to obtain a temperature of above about 220°F. prior to discharge from a high pressure to a low pressure zone. The degree of expansion of the product will depend upon a variety of considerations such as the particular protein source selected, the type and amount of sulfur-containing organic compound present, the amount of water in the mix, the temperatures and pressures developed and the amount of work done in the extruder, the pressure drop across the discharge of the extruder, etc. These variables can be controlled and thus the degree of expansion can be controlled in order to obtain a product with physical properties specifically suited to a desired final product. In all cases, however, it has been found that the sulfur-containing organic compound will cause the protein to form a firm expanded structure such that the expanded product retains its shape and structure under a wide range of conditions.

The expression "expanded edible protein product" as used in this application refers to a product which is fit for human and/or animal consumption. In this connection, obviouxly, it is contemplated that various ingredients may be obviously, which would be desirable for the final product in terms of low-cost, ease of processing, taste, texture, appearance, and the like.

"Sulfur-containing organic compound," as used herein, refers to and may be any of a large number of a large number of carbon-containing compounds having sulfur atoms present. Thus, sulfur-containing amino acids, lower alkyl mercaptans, lower alkyl sulfides, lower alkyl disulfides, thioacids and their salts, and other compounds, for example, thiamine, may be employed.

Such sulfur-containing organic compounds may be used alone or in combination. combination. The level of use of these compounds may be varied depending on the solubility and reactivity of the compound and the properties desired in the final product. Very surprisingly, the effect of processing a mix of a proteinaceous material with a sulfur-containing organic compound appears greater than what would be predictable based upon the amount of sulfur present in such compound especially since the Australian Patent specification previously referred to mentions that with sulfides concentrations approximately four times that of elemental sulfur should be utilized.

The potential uses of proteinaceous materials are thus significantly increased because of the achievement of physical characteristics such as expansion, orientation, and alignment in the resultant product which closely simulates meat in texture and appearance.

DETAILED DESCRIPTION OF THE PREFERRED EMBODMIENTS

An expanded edible protein product is made by processing a mix containing a proteinaceous material, a sulfur-containing organic compound and water, the mix being heated and worked at a pressure substantially above atmospheric pressure and the pressure then being suddenly released to allow the expansion.

The temperature of the mix is raised to above about 220°F. While the temperature of the mix prior to discharge from the extruder should be at least about 220°F., it is preferred that the mix should be at a temperature of 250°F. prior to discharge, and temperatures above 300°F. are even more preferred. The upper limit on temperature is determined by the temperature at which the ingredients may undergo undesirable quality degradation.

It is not definitely known whether under the processing conditions the expansion is due primarily to the action of the water vapor on discharge of the mix from the extruder. However, the sulfur-containing organic compound may possibly be reacting with the protein or causing the protein to react, or may be setting up the protein in a semi-plastic state that permits the product to expand significantly on discharge from the high pressure zone to a lower pressure area. In any event, regardless of the theory or mechanism involved, it is apparent that the method results in products having unexpected densities, textural characteristics and structural integrity, and improved flavors.

The proteinaceous material used may be any high protein material derived from vegetable, meat, fish, milk and egg protein sources or mixtures of several different proteinaceous materials. "High protein" means at least 30% by weight of the material is protein. While this minimal level appears to be necessary to obtain the desired degree of expansion, the amount of protein in the material may be much higher although in some cases alignment rather than expansion becomes more evident. It has been found that with soy flour and soy meal, expansion and alignment may be achieved when the protein content is about 50% by weight. Wheat gluten with a protein content of about 80% has been successfully used. Similarly, protein materials derived from vegetable sources other then soy beans as, for example, peanuts, cottonseeds and the like, as well as corn gluten, solvent-extracted fist meals and casein can be used. The proteinaceous material will generally be in the form of a ground flour or meal or pellets, bits or grits for processing. However, concentrates and isolates may be employed.

It has been found that excessive amounts of fat may interfere with expansion and alignment due to the lubricating effect of the fat and its possible hindering mechanical work. Accordingly, it has been found that it is preferred to keep the fat level below about 8% to 10% by weight of the proteinaceous material.

The desired characteristics of the expanded edible protein product can be achieved with a moisture content of from 15% to 50% by weight of the mix. For most proteinaceous materials a preferred level of water is from 20% to 35% by weight of the mix. Work with proteinaceous materials derived from soy beans has shown that the level of water should be increased as the protein level in the soy beans increases in order to obtain the desired degree of expansion or other characteristics such as orientation and alignment. For example, a 70% protein material derived from soy beans required about 30% to 35% water in the mix while a 90% protein material derived from soy beans required about 35% to 40% water by weight of the mix.

The amount of sulfur-containing organic compound used in preparing the expanded edible product will vary depending upon the amount of protein in the source material, the nature of the compound and the degree of expansion and alignment desired. In general, one would use the least amount of such compound which will result in a product with the desired characteristics. Accordingly, it has been found that the amount of sulfur-containing organic compound generally should not exceed 2.0% by weight of the proteinaceous material and should be at least 0.05% by weight of the proteinaceous material. A preferred range is about 0.2% to 0.6% of the sulfur-containing organic compound by weight of the proteinaceous material. As indicated previously, sulfur-containing amino acids, lower alkyl mercaptans, lower alkyl sulfides, lower alkyl disulfides, thioacids, and their salts may be employed. Among these clases of compounds, compounds such as cysteine, cystine, methionine, thiodipropionic acid, thioglycollic acid, thiamine, lignosulfonic acid and their salts are especially preferred. With certain of the compounds, a desirable meat-like flavor may be produced in the product during processing. Of course, combinations of sulfur-containing organic compounds may be utilized.

In preparing the product of this invention, the ingredients may be blended either prior to introduction into an extruder or in the extruder itself. The mix, as it is moved progressively forward in the extruder will be subjected to shear forces, mechanical work, heat and pressure. As already indicated, a minimum temperature of about 220°F. is desired prior to discharge of the mix in order to obtain the desired expansion. However, it has been found that heat alone is not enough to insure expansion to the desired degree. The mix must also be subjected to sufficient mechanical work in the extruder while sufficient heat is being developed to bring about the pressure needed to cause expansion. If desired, of course, additional heat may be supplied to the extruder and system generally.

The density of the extruded product can be varied from a dense hard extrudate to a porous extrudate with a density of less than 10 pounds per cubic foot. All of the extrudates, regardless of density, have textural characteristics indicative of alignment and have the unique feature of retaining their shape and structural integrity even after absorbing several times their weight of water. In addition to the effect of processing conditions upon density, it has been found that certain textural differences are caused by the selection of a particular protein source. Thus, wheat gluten is found to give an expanded product having a tough, meaty texture. Solvent extracted fish meals are found to expand less than soy flour. Corn gluten is found to expand very evenly, but results in a denser product than soy flour under similar processing conditions. Casein yields a very hard, dense, white product with long fibers.

The addition of starches or other fillers may tend to make the expanded cellular structure soft and at high levels to cause the structure to collapse. However, it may be useful to blend in low levels of starch or other filler to soften otherwise hard protein extrudates.

In some instances it will be desirable to blend in with the mix ingredients which will add to the microbiological stability of higher moisture final products, e.g., those with moistures ranging from 15% to 50%, in order to enable such products to be packaged without resort to sterilization after packaging. Thus, potassium sorbate, salt, propylene glycol may be employed. Similarly, glycerine and/or sugar may be added to the mix.

The size of the die opening in the extruder can be varied depending upon the degree of expansion to be achieved and the size of the extrudate or rope desired. Typically, a die opening of about ⅜ inch is used when processing about 400 to 450 lbs./hr. of wet mix through a Wenger Model X-25 extruder. The size of the die opening is thus dependent on the rate of material processed, the degree of expansion desired when using a particular extruder, the pressure and temperature buildup desired within the extruder, etc. Modifications in the design of the screw of the extruder and in the flights of the extruder screw may be made to alter the amount of mechanical work which will affect the processing variables.

The following non-limiting examples will illustrate various embodiments of this invention.

EXAMPLE I

An expanded protein product utilizing soy grits is made by the following procedure:

A mix consisting of 99.8% by weight soy grits and 0.2% cysteine (as the hydrochloride, hydrate) is dry blended until homogeneous. The mix is continuously metered into a Wenger Model X-25 extruder at a rate of 250 pounds per hour along with a stream of water. The water and the soy grits-cysteine mix are thoroughly mixed in the extruder and the amount of water added is such that the moisture content of the blended ingredients is about 25%. The pH of the mix is 6.7. Using 30 psig. steam in the jacket of the extruder, the mix is subjected to mechanical working as it moved toward the die head. The mix at a product temperature of about 300°F. is extruded through die openings of 11/32 inch diameter and discharged into the atmosphere.

The extruded ropes expand to about four times the size of the opening and the expanded product has a moisture content of about 23%.

The expanded product is then dried in an air stream at a temperature of 250°F. to a moisture content of less than 12%.

The dried, expanded product had a crisp, crunchy texture and a porous, cellular structure. The puff density of the product is found to be 0.27 g./ml.

EXAMPLE II

The product of Example I may be used as a partial replacement for meat in a canned pet food as follows:

Beef trimmings are dried and heated to 200°F. The cooked trimmings are then blended with the expanded protein product (chunks formed from the extruded rope) of Example I of a similar size and gravy in the following proportions by weight:

| | |
|---|---|
| Beef Trimmings | 50% |
| Expanded Protein Product of Example I | 17% |
| Gravy | 33% |

The gravy consists of the following ingredients:

| | % by Weight |
|---|---|
| Water | 94.237% |
| Gum | 1.00% |
| Starch | 1.50% |
| Salt | 3.00% |
| Vitamins | 0.0133% |
| Color Agents | 0.25% |

It is found that the expanded protein product soaks up the meat juices and gravy when the mix was retorted in a can. The canned pet food product is retorted for 60 minutes at a temperature of about 250°F. When the can is opened and the contents poured out, the expanded protein product chunks were found to have retained their shape, and to have a softened meat-like texture and flavor due to the absorption of the meat juices and gravy.

EXAMPLE III

An imitation meat product utilizing the expanded protein product (chunks formed from rope) of Example I can be prepared utilizing the following ingredients:

| | % by Weight |
|---|---|
| Expanded protein product of Example I | 62.0 |
| Egg White | 8.00 |
| Hydrogenated Vegetable Oil | 25.0 |
| Salt | 3.0 |
| Spices | 2.0 |

The egg white, salt and spices are mixed into melted vegetable oil and the expanded protein product chunks are then allowed to soak up the mixture. The chunks can be shaped if desired at this point and the product is allowed to cool.

The final product has a desirable, meat-like appearance, texture and flavor. The imitation meat pieces can be used in a variety of products as meat extenders. In some products such as chili con carne they can entirely replace the meat chunks.

EXAMPLE IV

A low-fat snack is prepared using the following ingredients:

| | % by Weight |
|---|---|
| Wheat Gluten | 50.0 |
| Soy Meal | 46.2 |
| Cysteine hydrochloride, hydrate | 0.3 |
| Salt | 1.5 |
| Cheese Flavor | 2.0 |

The blended ingredients are mixed with water to produce a mix with a 25% moisture content and the mix is processed through a Wenger Model X-25 extruder as in Example I. The expanded product has a moisture content of about 19% and is dried in an air stream at 250°F. to a moisture content of about 6%.

The dried product has a desirable crunchy texture and cheese flavor.

In a similar manner, a large variety of snack items can thus be prepared by varying the flavor from a cheese type flavor to a meat flavor, chocolate, honey, etc. Alternatively, flavor, spices, color, eta. may be added to the expanded product.

EXAMPLE V

Following essentially the procedure of Example I, a high protein cereal product is prepared from a mixture of 50 part soy grits, 25 parts casein, 24.8 parts corn gluten and 0.2 part cysteine hydrochloride, hydrate. Water is added to produce a mix having a moisture content of 30% prior to processing in the extruder. The expanded product is cut into chunks and dried to about 4% moisture.

The chunks are then sugar coated in a coating reel. Fifty-eight parts by weight of the chunks are sprayed with 42 parts of hot liquid syrup (consisting of 40 parts of melted sugar, 2 parts flavor and coloring agents) while the chunks are tumbled. The coated chunks are then dried to a final moisture content of about 3% prior to packaging.

EXAMPLE VI

The procedure of Example I is repeated in all essential respects except that cystine is employed in an amount of 0.5% based on the weight of soy grits, the dry feed rate is 325 pounds/hour, the water feed rate is 102 pounds/hour and the mix temperature is 300°F.

The expanded protein product obtained is found to have a puff density of 0.09 g./ml.

EXAMPLE VII

The procedure of Example I is repeated in all essential respects except that cysteine hydrochloride monohydrate is employed in an amount of 0.1% based on the weight of soy grits, the dry feed rate is 300 pounds/hour, the water feed rate is 102 pounds/hour and the mix temperature is 300°F.

The expanded protein product obtained is found to have a puff density of 0.33 g./ml.

EXAMPLE VIII

The procedure of Example I is repeated in all essential respects except that D,L-methionine is employed in an amount of 0.5% based on the weight of soy grits, the dry feed rate is 300 pounds/hour, the water feed rate is 102 pounds/hour and the mix temperature is 340°F.

The expanded protein product obtained is found to have a puff density of 0.24 g./ml.

EXAMPLE IX

The procedure of Example I is repeated in all essential respects except that sodium lignosulfonate is employed in an amount of 0.5% based on the weight of soy grits, the dry feed rate is 340 pounds/hour, the water feed rate is 111 pounds/hour and the mix temperature is 340°F.

The expanded protein product obtained is found to have a puff density of 0.23 g./ml.

EXAMPLE X

The procedure of Example I is repeated in all essential respects except that thiamine mononitrate is employed in an amount of 0.6% based on the weight of soy grits, the dry feed rate is 300 pounds/hour, the water feed rate is 100 pounds/hour and the mix temperature is 300°F.

The expanded protein product obtained is found to have a puff density of 0.36 g./ml.

EXAMPLE XI

The procedure of Example I is repeated in all essential respects except that calcium thioglycollate is employed in an amount of 0.4% based on the weight of soy grits, the dry feed rate is 250 pounds/hour, the water feed rate is 100 pounds/hour and the mix temperature is 300°F.

The expanded protein product obtained is found to have a puff density of 0.17 g./ml.

EXAMPLE XII

A pet food is made following in all essential respects the procedure of Example I, except that the following mix is used:

|  | % by Weight |
| --- | --- |
| Soybean Oilmeal | 91.46 |
| Beef Trims | 5.0 |
| Salt | 2.0 |
| Vitamins and Minerals | 1.09 |
| Artificial Color | 0.15 |
| D,L-Methionine | 0.1 |
| Thiamine | 0.1 |
| Cysteine HCl | 0.1 |

The density of the product chunks so obtained is 14 lbs./cu.ft.

EXAMPLE XIII

A soft moist pet food is prepared by allowing 20% expanded protein chunks to soak up an 80% preserved meat slurry.

The meat slurry is prepared by placing the following ingredients in an agitated steam jacketed kettle and cooking for 15–30 minutes at 200°F.

|  | % by Weight |
| --- | --- |
| Ground Beef Trimmings | 47.5 |
| Propylene Glycol | 2.5 |
| Salt | 2.5 |
| Phosphoric Acid | 1.0 |
| Emulsifier | 1.25 |
| Potassium Sorbate | .5 |
| Vitamins and Minerals | 2.0 |
| Sugar | 27.5 |
| Artificial Color | .02 |
| Process Water | 15.23 |

The expanded protein chunk is made following the procedure in Example I except that the following mix is used:

|  | % by Weight |
| --- | --- |
| Soybean Oilmeal | 90.7 |
| Sodium Caseinate | 7.0 |
| Salt | 2.0 |
| D,L-Methionine | 0.1 |
| Thiamine | 0.1 |
| Cysteine | 0.1 |

The expanded protein chunks are intimately mixed with the meat slurry for about five minutes until all free liquid is gone. The product is then cooled to 70°F. and may be packaged in any moisture impermeable wrapper. Product prepared was found to have 40% moisture, 14% protein and 16% fat at a pH of about 5.4. After six months storage at room temperature the product was bacteriologically stable.

The foregoing examples illustrate the wide variety of uses possible with the novel expanded protein products of this invention because of their unique qualities — crunchy texture when dry, ability to absorb several times their weight in water, a meat-like appearance when moistened and colored and ability to retain their shape, texture and structural integrity after absorbing water even under retort conditions. Obviously, there are many uses for the product of this invention and reference should be had to the appended claims for a definition of the scope of the invention.

What is claimed is:

1. A method of preparing an expanded, edible protein product having an open, cellular structure comprising forming an admixture of proteinaceous material having a protein content of at least about 30% by weight, from about 0.05% to about 2.0% by weight of said proteinaceous material of a sulphur-containing organic compound selected from the group consisting of cysteine hydrochloride, D,L-methionine, sodium lignosulfonate, thiamine mononitrate, calcium thioglycollate and mixtures thereof, and water in an amount sufficient to result in a moisture content of 15 to about 50% by weight of said admixture; heating the mix to a temperature above about 220°F, mechanically working the heated mix at a pressure substantially above atmospheric pressure; and expanding the mix by suddenly releasing the pressure.

2. The method of claim 1 wherein the mix is processed continuously through an extruder; the mix being subjected to mechanical working as it is moved from the inlet to the discharge of the extruder; the pressure in said extruder being substantially above atmospheric pressure; the pressure on the mix being released as it is forced through a die head at the discharge end of the extruder into an atmospheric pressure zone.

3. The method of claim 2 wherein said proteinaceous material and said sulfur-containing organic compound are dry blended before they are fed into the extruder.

4. The method of claim 1 wherein said expanded edible protein product is soft and moist, has a moisture content of at least 15% by weight, and is bacteriologically stable by virtue of the addition thereto of a material selected from the group consisting of potassium sorbate, salt, propylene glycol, glycerine, sugar and mixtures thereof.

5. The method of claim 4 wherein said edible protein product is expanded prior to mixing to introduce the soft moist characteristics with bacteriological stability.

6. An edible protein product comprising an extruded, expanded proteinaceous material having a protein content of at least about 30% by weight, said product having an open, cellular structure and containing added sulphur provided by from about 0.05% to about 2.0% by weight of said proteinaceous material of a sulphur-containing organic compound selected from the group consisting of cysteine hydrochloride, D,L-methionine, sodium lignosulfonate, thiamine mononitrate, calcium thioglycollate and mixtures thereof, said sulphur-containing organic compound having been admixed with said proteinaceous material prior to expanding said proteinaceous material.

7. The product of claim 6 wherein said proteinaceous material is soy meal.

8. The product of claim 6 wherein said proteinaceous material is wheat gluten.

9. The product of claim 6 wherein said proteinaceous material is a mixture of proteinaceous materials.

10. The product of claim 6 wherein said product is soft and moist, has a moisture content of at least 15% by weight, and is bacteriologically stable.

* * * * *

UNITED STATES PATENT AND TRADEMARK OFFICE
CERTIFICATE OF CORRECTION

PATENT NO. : 3,965,268
DATED : June 22, 1976
INVENTOR(S) : Charles T. Stocker et al It is certified that error appears in the above-identified patent and that said Letters Patent are hereby corrected as shown below:

In col. 2, line 47, replace "obviously" with -- employed --.

In col. 5, line 61, replace "dried" with -- diced --.

Signed and Sealed this

Third Day of May 1977

[SEAL]

Attest:

RUTH C. MASON
*Attesting Officer*

C. MARSHALL DANN
*Commissioner of Patents and Trademarks*